(12) United States Patent
Siegrist et al.

(10) Patent No.: US 6,179,600 B1
(45) Date of Patent: Jan. 30, 2001

(54) PROCESS AND DEVICE FOR HYDRAULIC DRIVE OF INJECTION MOLDING MACHINES

(75) Inventors: Ronald Siegrist, Oberuzwil; Bruno J. Stillhard, St. Gallen, both of (CH)

(73) Assignee: HPM Corporation, Mount Gilead, OH (US)

( * ) Notice: Under 35 U.S.C. 154(b), the term of this patent shall be extended for 1166 days.

(21) Appl. No.: 08/574,358

(22) Filed: Dec. 18, 1995

Related U.S. Application Data

(63) Continuation of application No. 08/192,717, filed on Feb. 7, 1994, now Pat. No. 5,529,478.

(30) Foreign Application Priority Data

Feb. 9, 1993 (DE) ................................................. 43 03 760

(51) Int. Cl.[7] ................................................. B29C 45/80
(52) U.S. Cl. ................................................. 425/145; 425/150
(58) Field of Search ................................ 425/145, 150

(56) References Cited

U.S. PATENT DOCUMENTS

| 3,433,256 | 3/1969 | Stillhard et al. . |
| 4,240,781 | 12/1980 | Flickinger et al. ............... 425/450.1 |
| 4,312,828 | 1/1982 | Flickinger et al. ................... 264/349 |
| 4,375,747 | 3/1983 | Friedrich . |
| 4,563,939 | 1/1986 | Siegrist ........................... 137/596.17 |
| 4,817,498 | 4/1989 | Takagi ................................. 91/361 |
| 4,855,095 | 8/1989 | Sato .................................. 264/40.5 |

FOREIGN PATENT DOCUMENTS

| 499 824 | 1/1971 | (CH) . |
| 29 02 264 | 7/1980 | (DE) . |
| 0 097 275 | 1/1984 | (EP) . |

OTHER PUBLICATIONS

Backe, Fluidtechnische Realisierung Ungleichmassiger Periodischer Bewegungen, Olhydraulic Und Pneumatik, at (May 22, 1987).

*Primary Examiner*—Tim Heitbrink
(74) *Attorney, Agent, or Firm*—Baker & Daniels

(57) ABSTRACT

An acceleration pressure is used as set value for the movement of the mass which is to be shifted, such as the mold clamping unit in an injection molding machine. For this purpose it is proposed to use preferably an electrically modulated pressure control valve for the pressure regulating device in the pressure drive system. Even with extremely short acceleration periods resonance oscillations are avoided, which until now prohibited the reduction of the acceleration period. With computing devices the movement of the mass can now be really controlled in relation to a selected velocity profile and/or a position profile or at least a part thereof.

3 Claims, 6 Drawing Sheets

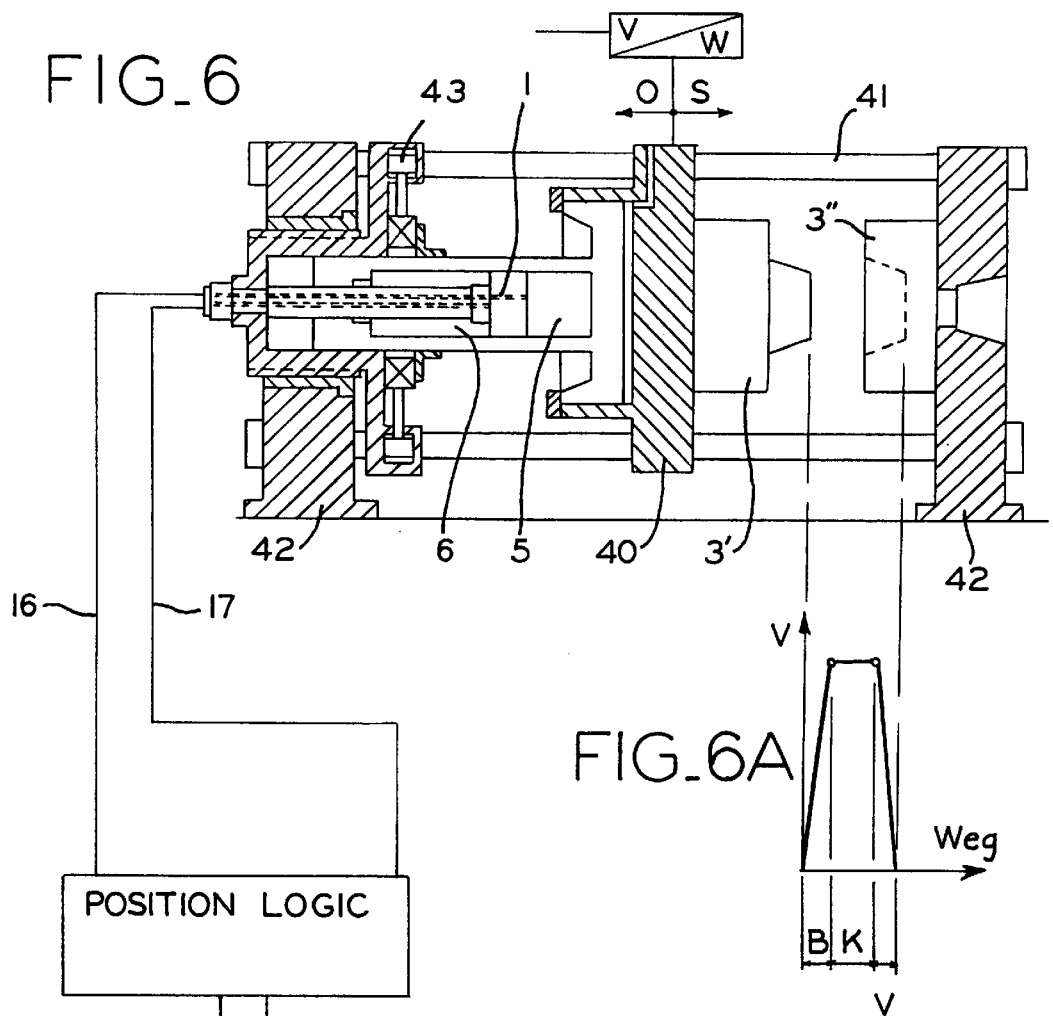
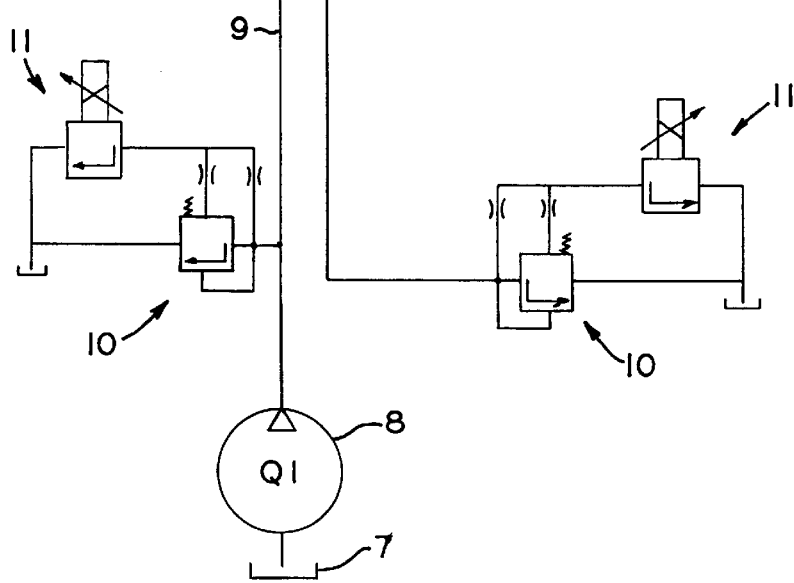

PROCESS AND DEVICE FOR HYDRAULIC DRIVE OF INJECTION MOLDING MACHINES

This is a continuation of application Ser. No. 08/192,717, filed Feb. 7, 1994 now U.S. Pat. No. 5,529,478.

BACKGROUND OF THE INVENTION

The invention relates to a process as well as to a device for a hydraulic mass-drive, especially for the closing and opening of the clamping mechanism in injection molding machines, with a controllable pressure operated system.

The hydraulic drive is essentially based on the peculiarity of a liquid. The rough definition of a liquid is: A media in liquid state, which differs from others by the free movement of the constituent molecules and the low compressibility. In contrast to pneumatic controls, hydraulics are differentiated in that in praxis the hydraulic media is considered noncompressible, which represents a simplification for the mathematical evaluation and the design of a complete hydraulic system.

One of the tasks in injection molding and die-cast machines is to close and open the clamping unit. Since this movement has no direct influence on the process it should happen as fast as possible to improve productivity. This means a heavy mass (all moving parts of the clamping unit including the movable half of the mold) needs to be moved from point A to point B and returned by oil-hydraulics. The respective end positions are to be set with high accuracy.

For example, the German Patent No. 2 902 264 (corresponding to U.S. Pat. No. 4,375,747) proposes therefore to achieve the acceleration and deceleration of the clamp drive mechanism by a defined increase and decrease of the oil flow. By the use of several electronic control elements it is possible to avoid acceleration shocks. In detail a 4-way valve with 3 positions is arranged between pump and motor which can be controlled electrically and which has a so-called ramp assigned in the electrical control arrangement. The output signal of the ramp is amplified to control the directional valve (4-way valve). There is no consideration of any compressibility of the hydraulic fluid or any expansion of the drive components with increasing pressure in this case.

In die-cast and injection molding machines a resting or moving mass is driven by a plunger-cylinder unit, and is brought up to a certain velocity. For this purpose a throttle is increasingly opened to raise the acting pressure on the plunger, which drives the mass. The hydraulic fluid is not non-compressible, and also the components of the drive mechanism expand, especially the hydraulic fluid conductors, and therefore a certain part of the hydraulic flow input is absorbed capacitively by the drive system and does not cause a movement of the mass immediately. This capacitively absorbed hydraulic flow represents a compressed spring, which together with the mass is an oscillating device. The oscillating impulse increases with decreasing time for reaching the end velocity. Therefore, if one uses the set-point generator with a steep ramp between the various set-points, the system will respond with lowly damped oscillations, which means the desired velocity will only be reached gradually.

The best known method uses directional valves, which feed oil flow in the desired direction to a cylinder. These can only be used up to a certain velocity, since the acceleration is not controllable. More recent methods use so-called proportional—directional—valves. These control the valve opening in relation to the solenoid coil current. Even with this method the acceleration control is limited. In machine tools the typical acceleration period is approximately 6 times the swing period of the mass/spring oscillators (spring= elastic oil column), in order to reduce the time for operational movements. Typically, dependent on degree of dampening applied, vibration can occur already if the acceleration period is 3 times the swing period. Typical natural frequency for the clamping mechanism of a fully hydraulic injection molding machine, dependent on machine size is 3 to 8 Hz, which means usable acceleration ramps are in the order of 0.3 to 1.0 seconds. This results in a total loss time of 1 to 2 seconds per cycle.

According to the proposal of European patent No. 97275 (corresponding to U.S. Pat. No. 4,563,939) the inventors tried to improve the dynamic of the hydrostatic drive for die-cast or injection molding machines, in order to reduce the machine cycle time and/or to reduce the wear and tear of the machines. In this case the mass to be accelerated or decelerated is intermittently driven by hydrostatics with a correspondingly controlled valve arrangement, in which dependent on the direction of a change in a ramp angle, the oil flow increase or decrease is related to the compression volume of the system. The valve arrangement accordingly is controlled by a set-point generator, which provides a position or time dependent ramp with superimposed positive control impulse at the start of the ramp rise, or at the end of the ramp fall, respectively, and with a superimposed negative control impulse at the end of the ramp rise, or at the start of the ramp fall, respectively. This provided reasonable results in practical applications but in many cases, because of improper settings, improvement of the dynamic behavior is not achievable.

The objective of the invention is to reliably control the dynamic behavior with simple means, also at shortest acceleration periods, in order to reduce especially the machine cycle time.

SUMMARY OF THE INVENTION

The solution according to the invention is characterized, in that the movement of the mass in relation to a velocity profile and/or position profile (or at least a part thereof) is closed loop controlled, with the acceleration pressure for the mass as control medium.

In this new invention astonishingly the natural frequency of the spring/mass oscillator is no longer significant, rather is the limiting frequency of the pressure generator and control the system limitation. This limiting frequency for example is in the order of 20 to 50 Hz. With that markedly steeper acceleration, shorter actuation periods are allowable without any disturbing vibration forces. Further the system losses are much lower than in state-of-the-art systems. This reduces the energy consumption especially during fast cycles. Even if it is not explainable on a phenomenological basis, measurements have shown a total elimination of the previous pressure shocks due to oscillations even with the steepest ramps as required by the pressure system, apparently because the controlled pressure adjustment prevents the mass/spring oscillator behavior of the elastic oil column.

Further, the invention allows for a number of advantageous arrangements. Most preferred is the control of the acceleration pressure directly dependent on a selectable velocity and/or position profile. The acceleration pressure can be calculated as a function of time and via a comparison device it can be adjusted for selected velocity and/or position profiles. Advantageously an adjustable counter pressure will be maintained in the return line, this for the controlled deceleration of the mass, and preferably also in the return line the counter pressure will be calculated and adjusted as a function of a velocity and/or position profile. According to a further arrangement it is proposed, that in the startup phase, over a selectable time period a continually changing acceleration pressure is provided according to a selectable motion profile, where the motion profile in a velocity/position or velocity/time diagram initially shows an approximate linear rise, gradually changing to a constant value. Further a continually changing acceleration pressure can be provided during the acceleration and deceleration phase, where the motion profile in a velocity/position diagram is at least in the approximate shape of a trapezoid. For less demanding requirements for an exact motion profile it is possible that the motion profile for the mass is at least monitored in one but preferable two or more key positions, and compared with a selected motion profile with the differential provided as correction signals for the control of the following cycle. On this basis interference values can be eliminated adaptively.

The new invention relates to a device to drive a moveable mass, especially the clamping mechanism of an injection molding machine with a controllable hydraulic pressure-drive system and is characterized, that the pressure-drive system includes a pressure regulating device with a pressure control valve, which preferably is configured as electrically (via computing devices) modulated pressure control valve. For full controllability of the motion profile for the mass it is preferred to integrate a velocity or position feedback with the moveable mass, where almost simultaneously with control signal the desired acceleration pressure can be corrected and therewith the movement of the mass can be controlled. Preferably suitable computing devices with high processing capability are used, which drive the pressure control valve via a selectable time function and/or a velocity and/or position profile.

Further a position logic, preferably a directional valve group or a switchable cartridge valve bridge, is designated for the mass movement and direction control and in the return line of the hydraulic drive system a mass deceleration device. The deceleration device can be configured as an oil flow regulated resistor or also as an electrically modulated pressure control valve.

The moving mass is preferably monitored by a velocity and position feedback. The direction of movement is selected with the position logic (directional valve or switchable cartridge valve bridge). The acceleration is adjusted via the electrically modulated pressure control valve. In the return line of the position logic a device is arranged, which allows to build-up a counter pressure, in order to decelerate the mass. For this purpose different valve arrangements can be used. For example:

An oil flow regulated resistor with the great advantage that this is a very cost effective device, or an electrically modulated pressure control valve, with the advantage of an optimal efficiency.

According to another configuration, the pressure control valve consists of an electrically controlled proportional pressure adjustment valve as pilot and with a pressure limiting valve in the main stage and is connected directly with the outlet of the hydraulic pump. Further it is possible to use a pressure accumulator as an oil source with a pressure control consisting of a pilot configured as an electrically controlled pressure adjustment valve and the main stage as pressure reducing valve.

BRIEF DESCRIPTION OF THE DRAWINGS

In the following the invention is explained with further details based on several application examples.

FIGS. 6 and 6a show a drive analog to FIG. 5 for an injection molding machine application, but with electrically controlled pressure in the pressure line and the return line of the system.

DESCRIPTION OF THE PREFERRED EMBODIMENTS

Figure 1:
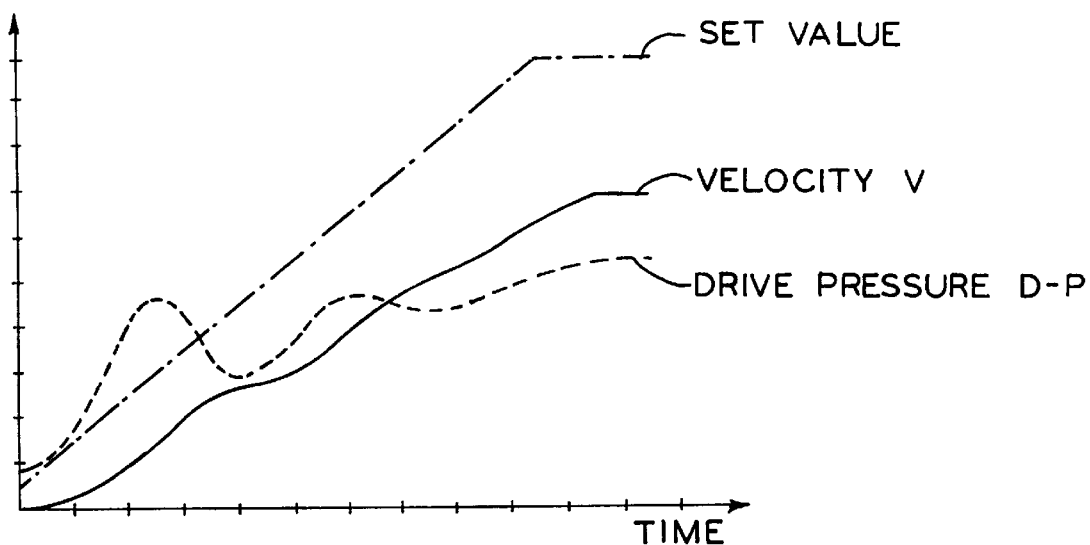
FIG. 1 shows a known velocity/pressure plot with low acceleration
Figure 2:
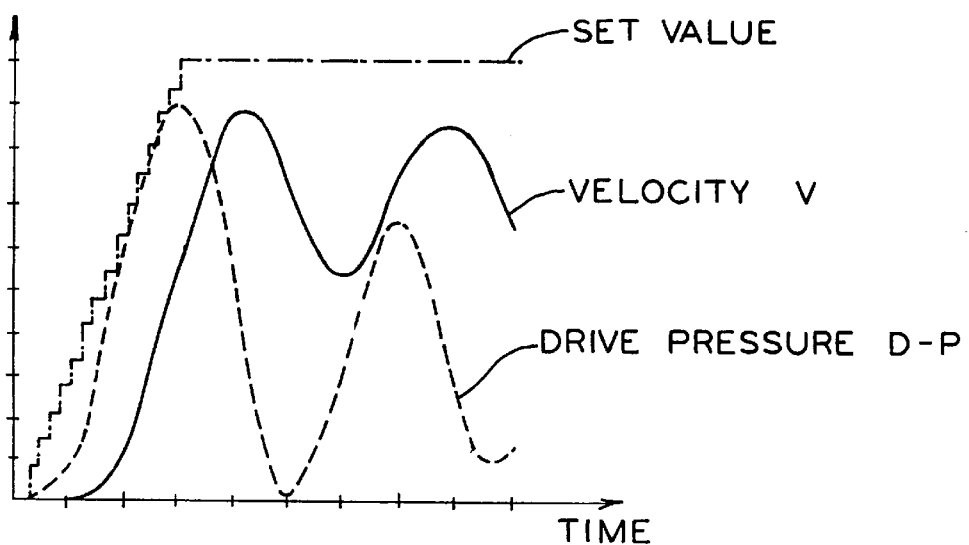
FIG. 2 shows a known velocity/pressure plot with high acceleration.
Figure 3:
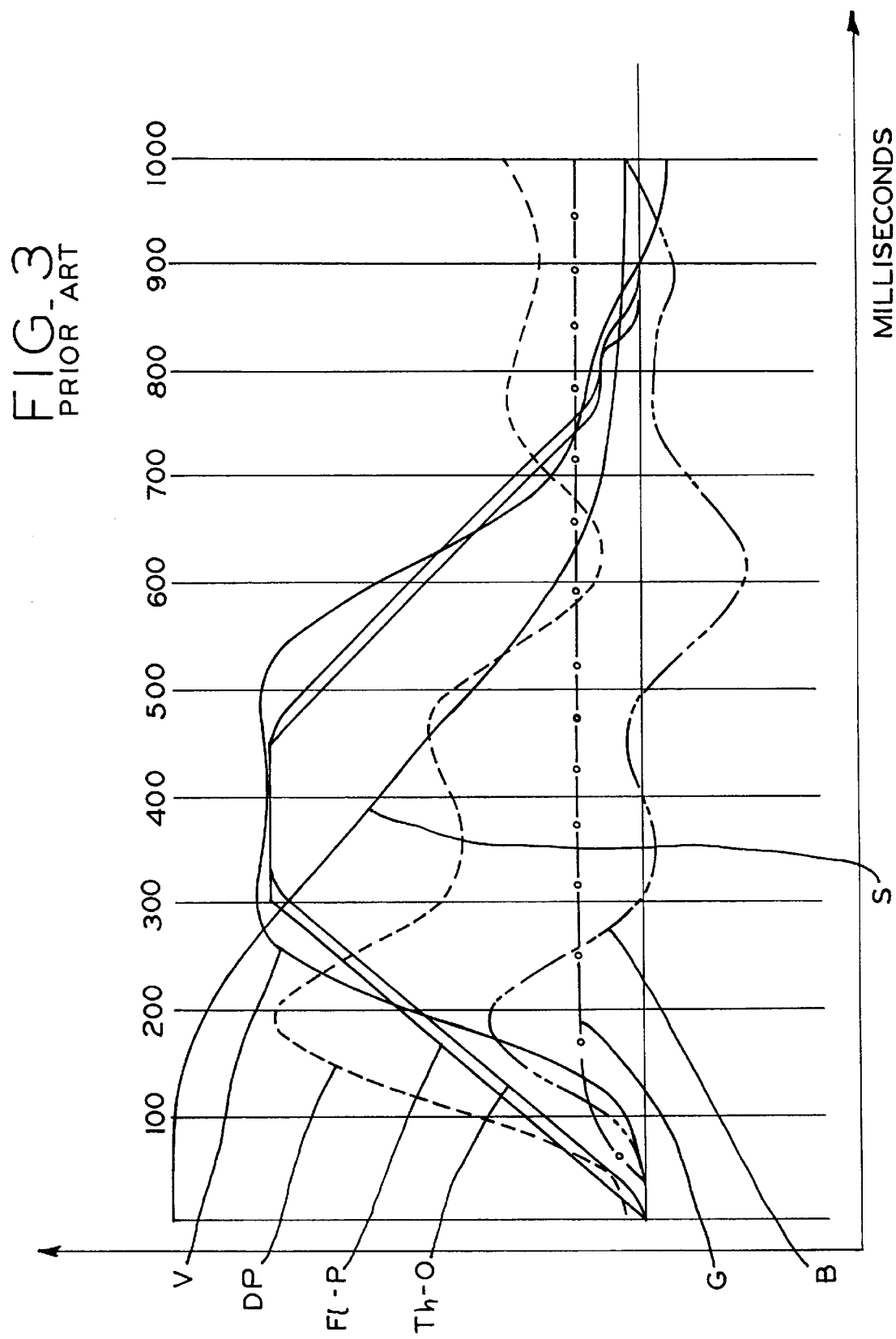
FIG. 3 shows the known plot of pressure with a controlled oil flow in the drive control of an injection molding machine.

FIGS. 1 to 3 describe the state of the art. Although in FIG. 1 a relatively long acceleration time was selected, a typical pressure resonance oscillation occurs in the system. Toward the end of the ramp the oscillation fades out, so that this solution is still acceptable. In FIG. 2 a relatively steep acceleration ramp was applied by a corresponding increase of the oil flow. The plot for the drive pressure (D-P) shows extreme resonance oscillations. Even more critical is the fact, that also the velocity (V) of the moving mass starts to oscillate with some phase shift. Such a velocity plot is not acceptable in practical applications. Such a system is no longer controllable. Also shocks and forces occur toward the end of the movement, which are very undesirable.

Figure 4:
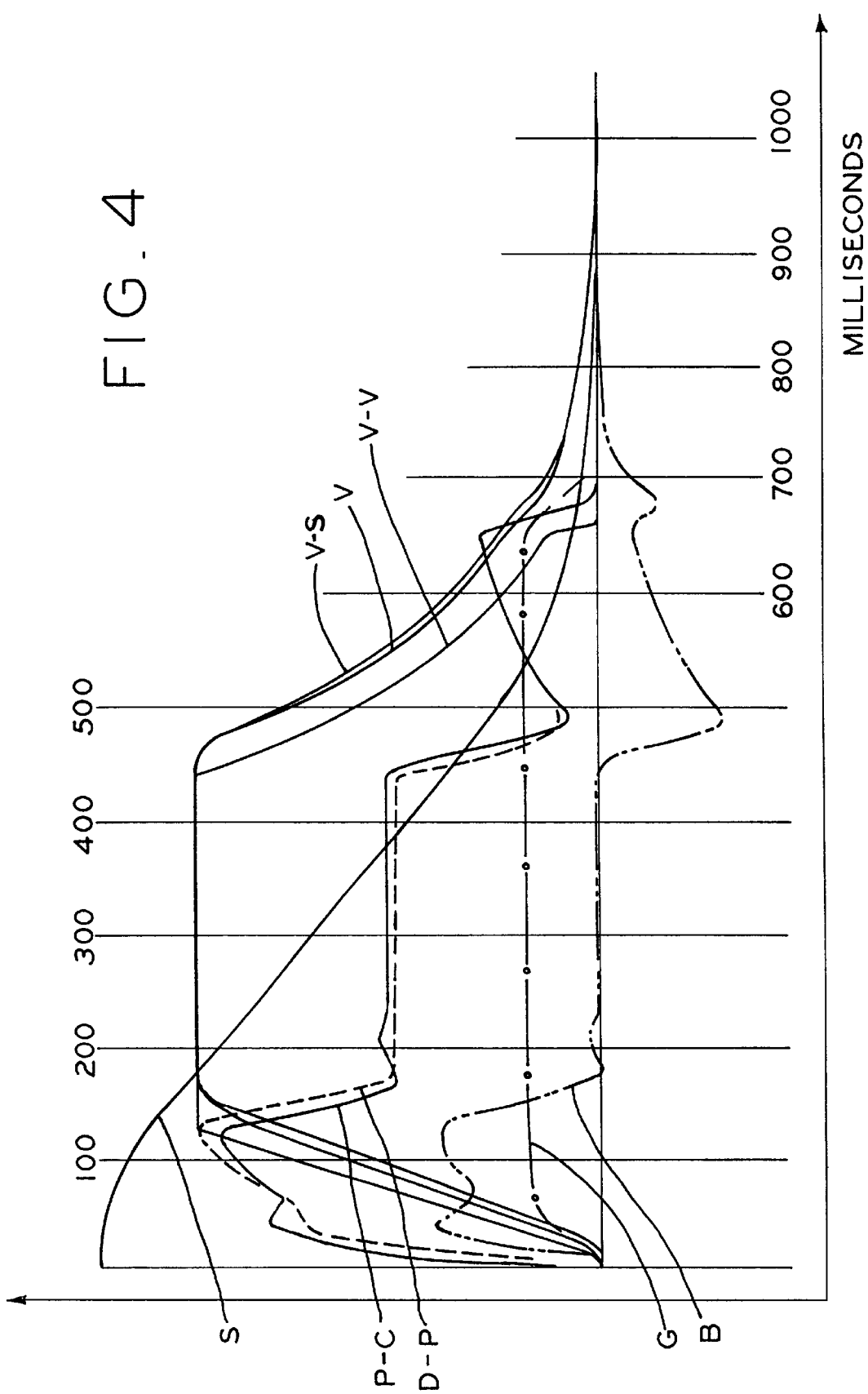
FIG. 4 shows a plot of the same parameters as FIG. 3, but with pressure adjustment according to the invention.

In FIGS. 3 and 4 the following designations are used:
S=Position
F1-P=Flow Control Signal
Th-O=Valve Opening
D-P=Acceleration Pressure
G=Counter Pressure (return line)
B=Acceleration
V-S=Velocity Signal (from sensor)
V-V=Velocity Control Signal FIG. 3 shows the plots for the main parameters like in FIG. 2. A first segment is recognizable with the start-up acceleration, the second segment is the constant velocity and the third segment is the deceleration at the end of the movement. Two important statements can be made from this graph. The resonance oscillations continue till the end of the movement. Also corresponding acceleration forces occur till the end of the movement. Therefore neither an exact path description over time, nor much less the accurate movement behavior at the end of the movement is predictable. Both facts necessitate reduction of velocity for the moving mass. This increases the cycle time.

FIG. 4 shows the same main parameters for measurement on a machine according to the invention, with the pressure being set in this case. If one compares the plot for the pressure control signal (P-C) with the plot for the acceleration pressure (D-P), it shows a surprisingly close similarity, which means that the acceleration pressure is truly controlled or set. There are no more sinusoidal waves like in FIG. 3, neither for the pressure nor for the acceleration, especially no more disturbance at the end of the movement. The movement of the mass is completely under control and therefore for the first time the mass movement is truly regulated. Hereby it does not matter if the mass movement is controlled in relation to the velocity profile or the position profile. For both the control "fits". The concrete selection of the control components depends first of all on the suitability of the respective sensors. For the first time it has been possible to select extremely short ramps with completely constant movement following the acceleration phase. Either the complete profile according to the invention or only a part of it can be realized in applications.

Figure 5:
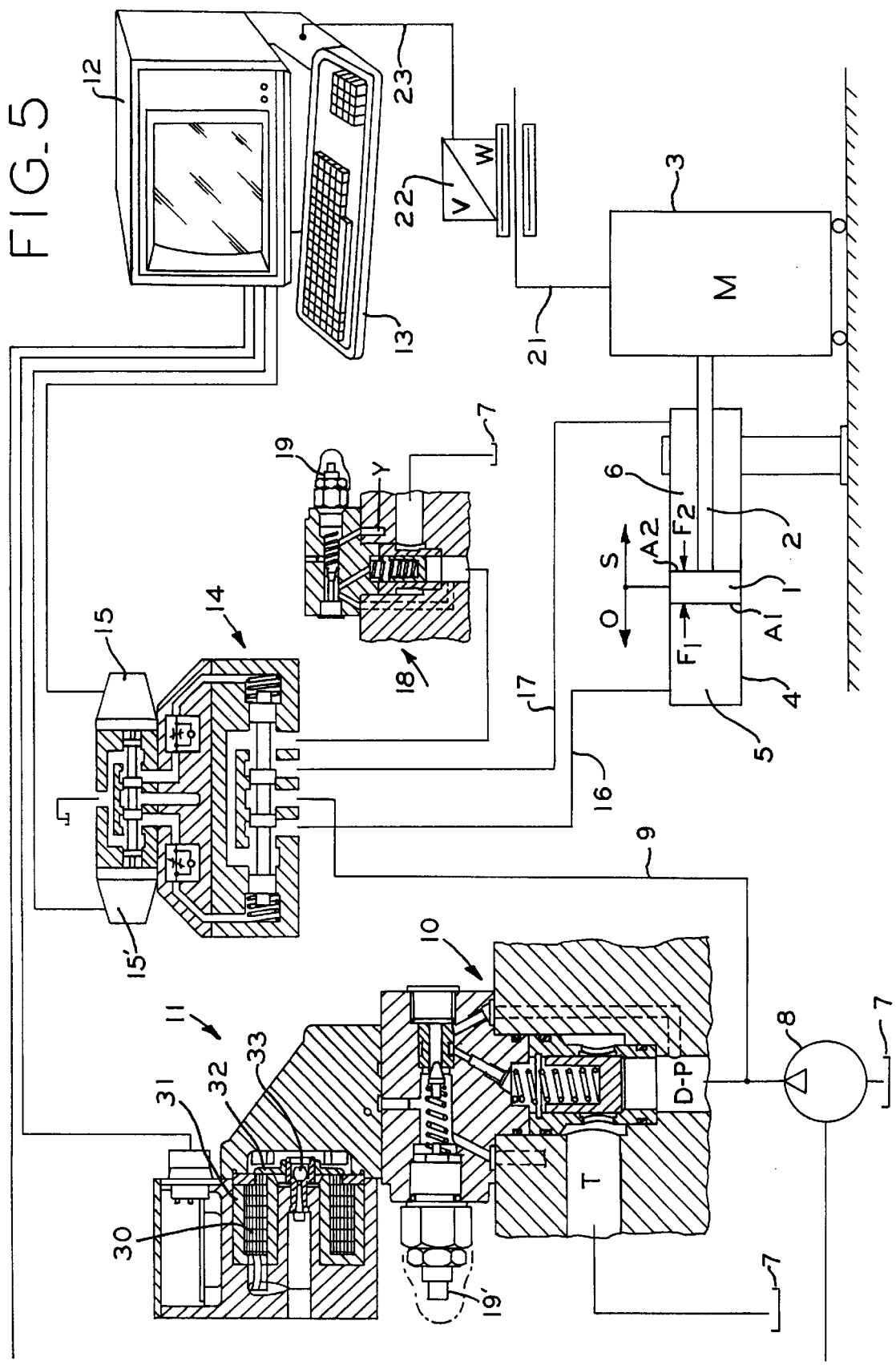
FIG. 5 shows a partly schematic, partially concrete, drive arrangement for the movement of a mass according to the invention.

FIG. 5 illustrates with much concrete detail the basic configuration of a design solution according to the invention. As the mass m all mass components such as the plunger 1, the rod 2, and the mold mass 3 must be combined. In the hydraulic cylinder 4 the pressure side is on the left (5) and the counter pressure side is on the right (6). According to the law of hydrostatics F1 is opposite of F2. F1 minus F2 represents the acceleration force or just a constant sliding force or a deceleration force, if F2 exceeds F1. S indicates the closing movement and O the opening movement. The oil return line is shown with oil reservoir symbol 7, as is the oil pressure pump with the symbol 8. On the pressure side the pump 8 is connected with pressure line 9 to the pressure limiting valve 10, which is connected with a return line to the oil reservoir 7. The pressure limiting valve 10 is the main stage, which is regulated by a pilot valve 11. The pilot valve is a known electrically controlled proportional pressure adjustment valve. The pilot valve 11 is driven by an electronic computer 12, which is symbolically shown as a PC with keyboard 13.

The pressure line 9 is not directly connected with pressure side 5 of piston 1 but rather via a position logic or a corresponding directional valve 14 and an acceleration pressure line 16 and connects to the counter pressure side 6 via the counter pressure line 17.

The required control signals are provided by the computer 12 via the electrical solenoid actuators 15 and 15' respectively. According to the example of FIG. 5 the return oil of the directional valve flows through a manually adjustable pressure limiting valve 18 to the oil reservoir 7. The pressure setting can be adjusted by the pilot needle valve with manual adjustment screw 19. In principle, the pressure limiting valve 18 can be the same design as the pressure limiting valve 10, which includes a manual adjustment screw 19' for adjusting the pressure setting. The electric control wires from the computer 12 are not designated in detail.

The mold mass 3 is schematically sliding a measuring rod through the sensor 22, so that the sensor 22 can recognize velocity V or position W respectively or both, dependent on the selection of specific sensor elements. The measured values are fed back to the computer 12 via the signal line 23.

As shown in FIG. 4, it is important that the plot of the actual acceleration pressure matches the corresponding pressure setting signal closely. It has been shown that for that purpose the valve as shown in Swiss Patent 499824 (corresponding to U.S. Pat. No. 3,433,256) (FIG. 2 for example) is most suitable. The patent document covers a complete functional description of this valve. This valve provides a direct proportionality from modulated electrical current to the controlled pressure. The solenoid coil 30 builds a magnetic field and the magnetizable material becomes a magnet 31 which can hold the armature 32, which is also made from magnetic material, in desired positions. Between armature 32 and magnet 31 is a gap through which oil flows from a ball valve 33, which is controlled by armature 32.

The plate like configuration of armature 32 allows to build electromagnetic fields with relatively large forces, significantly larger than the forces from acting oil pressure, so that with the corresponding setting signals from the computer for variable electric voltage a desired pressure profile is modulated. In the example of FIG. 5 only the acceleration pressure according to the desired position or velocity profile of the mold mass 3 is controlled. The counter pressure fixed setting is adjusted with pressure limiting valve 18, which must be considered in the computer program.

FIG. 6 is a simple hydraulic control arrangement for the application in an injection molding machine. A shield 40, with an attached mold half 3' is in the position of the beginning of the mold closing movement S. The shield 40 is guided in 4 columns 41 and the machine frame 42. The counter mold half 3" is stationary fixed to the machine frame 42. For the molding process this example also shows a locking device 43, supporting the holding force during the injection. In both the pressure and counter pressure side the hydraulic pressure is modulated with the electrical signal settings. FIG. 6A shows a simplified velocity-position profile for the injection molding machine, in which B indicates the acceleration phase, K the phase of constant velocity and V the deceleration phase. The velocity profile shows a possible ideal trapezoid.

Figure 7:
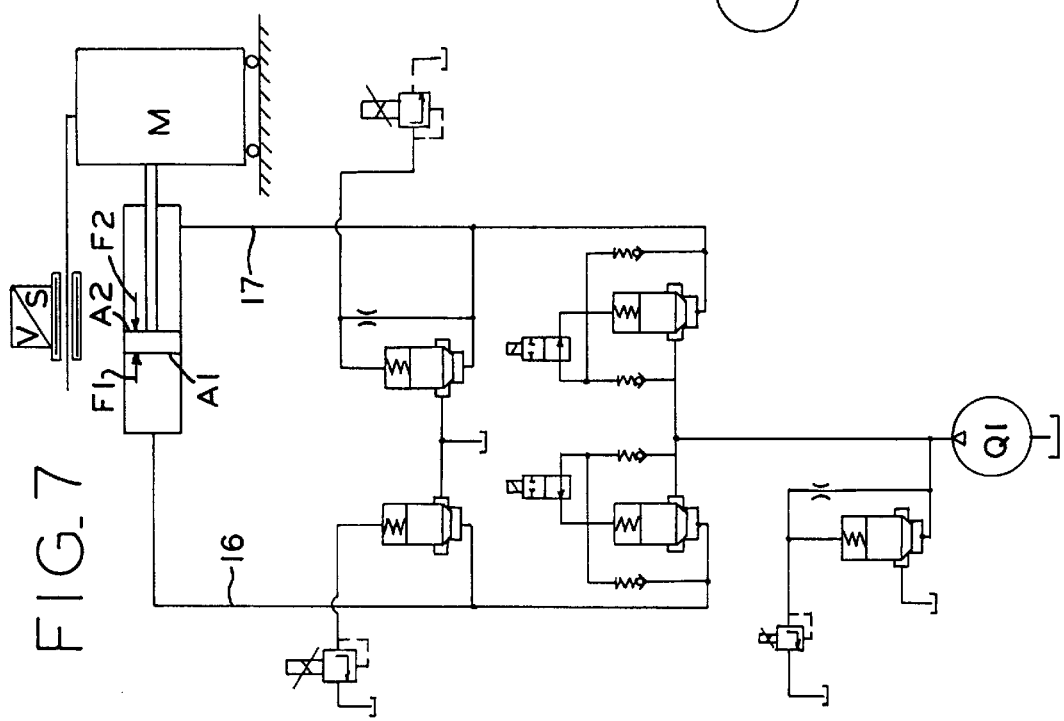
FIG. 7 is similar to FIG. 6 but with a switchable cartridge valve bridge.

FIG. 7 is a further detailed arrangement, in which instead of the simple position logic a switchable cartridge valve bridge is used.

Figure 8:
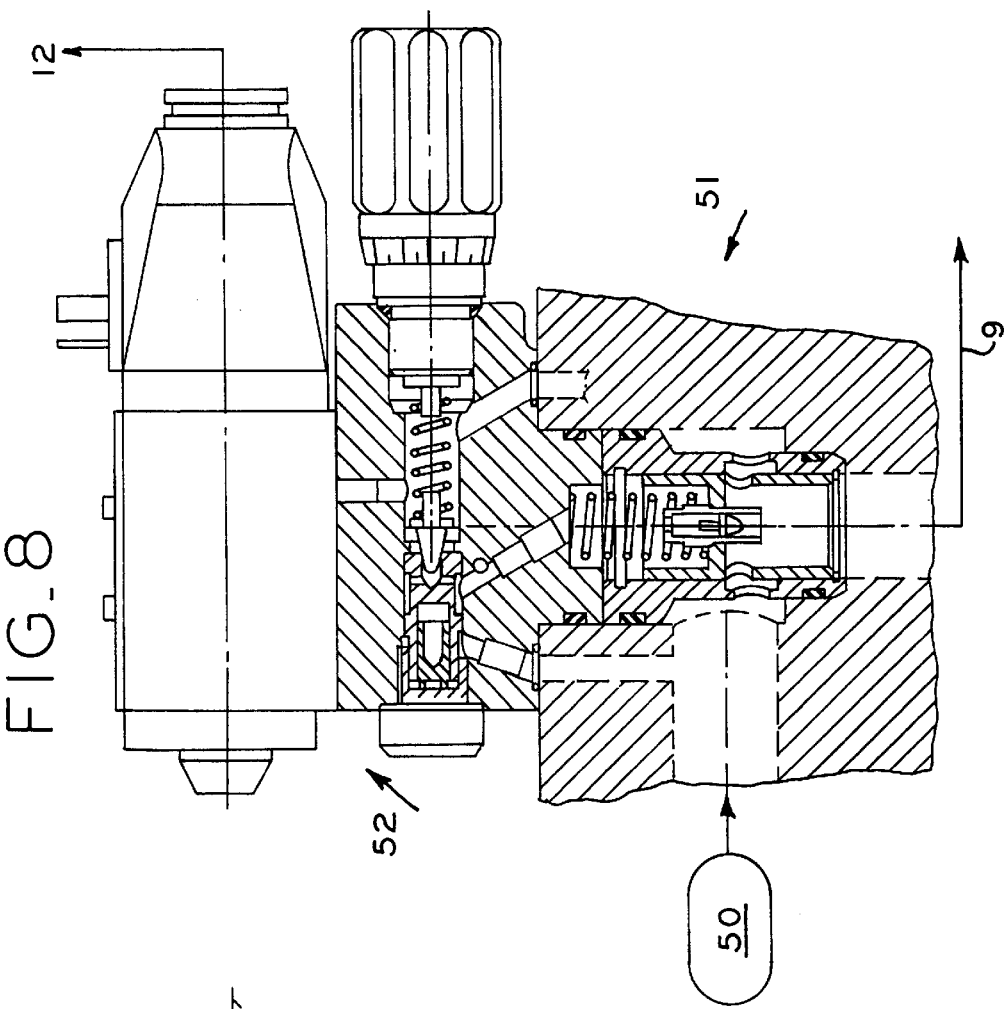
FIG. 8 shows a valve assembly consisting of an electrically controlled proportional pressure adjustment valve with a pressure reducing valve for use with a pressure accumulator.

FIG. 8 demonstrates another arrangement, with pressure accumulator 50 replacing pump 8. In the main stage the pressure limiting valve 10 (as used in FIG. 5) is replaced by a pressure reducing valve 51. The remaining arrangement for the hydraulic control system with accumulator can be identical to any of the pump systems. For the pilot valve 52 an electrically controlled proportional pressure adjustment valve is used.

Applications according to the invention are not limited to injection molding machines, but also can be used in die casting machines or in hydraulic presses.

Major advantages with the new invention result in devices for injection molding and pressing of mass produced parts with very short cycle times, in which case a hydraulic pressure drive system is designated to the closing part, or the fast moving machine mechanism, respectively, and wherewith computing equipment and a corresponding control arrangement a modulated oil pressure is provided to control a selectable velocity or position profile.

What is claimed is:

1. An injection molding machine having a movable die section therein, comprising:

a stationary cylinder and a piston slidably received in said cylinder and being connected to said movable die section;

a pressurized fluid source;

a port in said cylinder connected to the pressurized fluid source via a fluid line for admitting fluid under pressure into said cylinder on one side of said piston; and a controller for controlling the pressure of the fluid in said fluid line, said controller including a sensor for sensing at least a portion of at least one of a time function, a velocity profile and a position profile of said movable die section at all times during movement of said movable die section between first and second positions and producing an output signal indicative thereof, wherein at said first position said movable die section is operably arranged with a second die section for formation of an injection molded product, wherein at said second position said movable die section is spaced from the second die section for molded product ejection, wherein said output signal is fed into a comparator for comparing said output signal to a control parameter, said comparator outputting a control signal to a pressure regulating device in said fluid line for controlling the pressure of fluid entering said port, and hence directly controlling the acceleration of said movable die section at all times during movement of said movable die section between said first and second positions.

2. The machine of claim 1, wherein the pressure regulating device is an electrically modulated pressure control valve.

3. The machine of claim 1, including a position logic device located in said fluid line for the movement of said movable die section, wherein said position logic device comprises one of a directional valve and a switchable cartridge valve bridge with two-way valve inserts.

* * * * *